Figure 1:
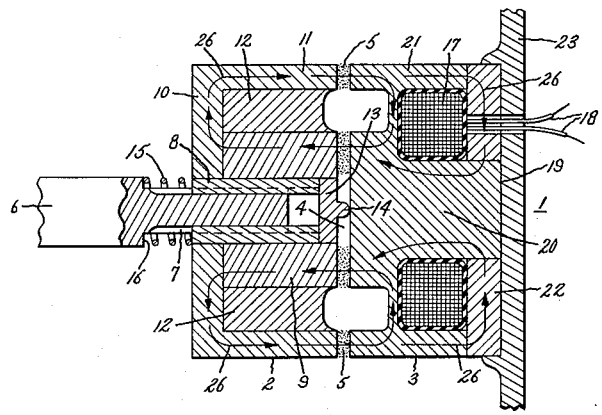

Oct. 20, 1953 K. M. FEIERTAG 2,656,026
PERMANENT MAGNET BRAKE
Filed Oct. 31, 1950

Inventor:
Karl M. Feiertag,
by Ernest H. Britton
His Attorney.

Patented Oct. 20, 1953

2,656,026

UNITED STATES PATENT OFFICE 2,656,026

PERMANENT MAGNET BRAKE

Karl M. Feiertag, Fort Wayne, Ind., assignor to General Electric Company, a corporation of New York Application October 31, 1950, Serial No. 193,216

4 Claims. (Cl. 192—21.5)

This invention relates to magnetic devices such as clutches and brakes, and in particular to devices of this type having a magnetic medium arranged in the air gap.

Magnetic devices such as clutches, brakes and dynamotors have been constructed utilizing a magnetic medium, such as iron powder in oil or a mixture of powdered iron and graphite, arranged in the air gap. This magnetic medium solidifies under the influence of flux traversing the air gap and thus provides a force transmitting connection between two relatively rotatable members of the device. It has been found, however, that it is desirable to provide such a device wherein an interruption of the power supply results in a magnetic flux traversing the air gap to couple the two relatively rotatable members together. Such a device is useful as a "fail-safe" brake, or a clutch where the driving connection between the members is required even though the power supply is interrupted.

An object of this invention is to provide an improved magnetic device such as a clutch or brake.

Another object of this invention is to provide an improved magnetic device utilizing a magnetic medium in the air gap which is adapted to provide a force transmitting connection between the relatively movable members of the device when the power supply is interrupted.

A further object of this invention is to provide an improved magnetic device having a magnetic medium arranged in the air gap for providing a force transmitting connection, said device being adapted for use as a "fail-safe" brake.

Further objects and advantages of this invention will become apparent and this invention will be better understood by reference to the accompanying drawing and description, and the features of novelty which characterize this invention will be pointed out with particularity in the claims annexed to and forming part of this specification.

In accordance with this invention, there is provided a magnetic fluid brake having a pair of relatively rotatable members defining an air gap therebetween. A permanent magnet associated with one of these members produces a unidirectional flux traversing the air gap. A magnetic medium is arranged in the air gap and is adapted to be solidified by this flux to provide a force transmitting connection between the relatively rotatable members. An electromagnet associated with the other of these members produces a second unidirectional flux traversing the air gap. This second-mentioned flux is in opposition in the air gap to the flux produced by the permanent magnet. Thus when the electromagnet is energized the two fluxes are neutralized in the air gap with the result that the magnetic medium is not solidified and there is no driving connection between the relatively rotatable members. Therefore upon failure of the power supply, the flux of the permanent magnet will traverse the air gap which makes the invention adaptable for use in a "fail-safe" brake. Another feature of the invention is that one of the relatively rotatable members is axially movable whereby the repelling force created by the two opposing magnetic fields increases the width of the air gap which decreases the effect of the flux of the permanent magnet in solidifying the magnetic medium.

Figure 2:
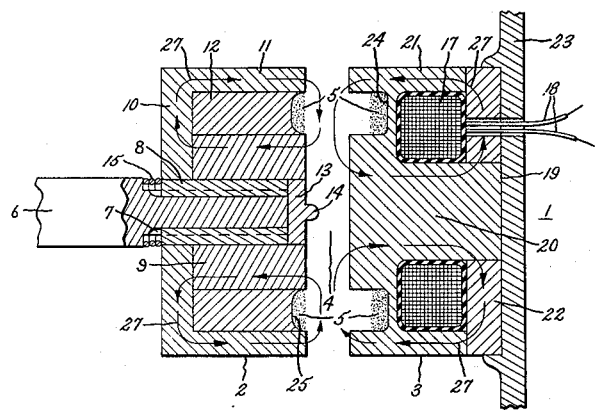

In the drawing, there is shown a side elevational view, in section, illustrating a magnetic brake constructed in accordance with this invention and showing this construction when used for transmitting force. Fig. 2 is a sectional view illustrating a magnetic brake constructed in accordance in this invention and showing this construction when not used for transmitting force.

Referring now to the drawing, there is shown a magnetic type brake 1 having a rotatable member 2 and stationary member 3 defining an air gap 4 therebetween. Arranged in air gap 4 is a magnetic medium 5, such as oil and iron particles, which is adaptable to being solidified when placed under the influence of a magnetic flux.

Rotatable member 2 is mounted on a driving shaft 6, the end of the driving shaft 6 being splined as at 7. The rotor assembly of relatively rotatable member 2 is provided with a splined sleeve 8 which is adapted to move axially upon the splined end 7 of shaft 6, sleeve 8 being formed of a non-magnetic material. Surrounding splined sleeve 8, and rigidly fixed thereto, as by a press fit, is an axially polarized permanent magnet ring 9 having a magnetic pole piece 10 which is U-shaped in cross-section so that it has an annular portion 11 which extends to air gap 4. Between permanent magnet ring 9 and annular portion 11 of magnetic pole piece 10, a non-magnetic cylinder 12 is provided so that the magnetic circuit of permanent magnet 9 must pass through the air gap 4.

Non-magnetic plug 13 is positioned in the end of permanent magnet ring 9 and is provided with a projection 14 which prevents adjacent faces of rotatable member 2 and stationary member 3 from contacting each other. A coil spring 15 is positioned between shoulder 16 on shaft 6 and sleeve 8 on rotatable member 2 and operates in compression to bias rotatable member 2 toward stationary member 3.

Stationary member 3 is provided with coil 17 having power leads 18 which are connected to an external power supply (not shown). Stationary member 3 is further provided with coil cup 19 having a central annular core 20 and an outer cylindrical portion 21. Coil cup 19 is formed of a magnetic material and serves as a flux path for the magnetic field produced by electromagnet 17. A magnetic ring 22 serves to complete the magnetic circuit for electromagnet 17 between the outer cylindrical portion 21 and the core 20 of coil cup 19. All elements comprising stationary member 3 are rigidly secured together and firmly attached to stationary member 23 which may be a motor housing or an independent structure.

The operation of the device is as follows: Referring to Fig. 1, when the coil 17 is not energized the attractive force of permanent magnet 9 pulls the rotatable member 2 toward stationary member 3, but is prevented from forming an overall surface contact with stationary member 3 by the projection 14 on the plug 13. Projection 14 serves as a spacer to control the minimum size of air gap 4. Spring 15 aids the attractive force of permanent magnet 9 in moving rotatable member 2 toward stationary member 3. Spring 15 is a relatively weak spring which is provided for the purpose of accelerating the movement of rotatable member 2 at the period when the magnetic attraction between the stationary and rotatable members is the weakest. If a fast action is not required, this spring may be omitted. In the position shown in Fig. 1, coil cup 19 provides the return path for the flux produced by permanent magnet 9 as indicated by the arrows 26 on the drawing. In crossing and recrossing air gap 4 the flux of permanent magnet 9 solidifies magnetic medium 5 to produce a force transmitting connection between members 2 and 3.

Referring now to Fig. 2, coil 17 is so wound and connected to the power supply that it creates a magnetic flux opposite in direction to that of permanent magnet 9, as indicated by the arrows 27 in Fig. 2. This creates a repelling force between rotatable member 2 and stationary member 3. This repelling force urges member 2 away from member 3 and thereby increases the width of air gap 4. Also, the opposing fluxes neutralize each other in the air gap so that the magnetic medium 5 is not solidified. At this time the magnetic medium 5 is drawn into the undercut portion 24 in the face of coil cup 19 adjacent the air gap and undercut portion 25 in the face of non-magnetic spacer ring 12 of the rotatable member 2 by stray lines of magnetic flux produced by electromagnet 17 and permanent magnet 9 respectively.

It is readily apparent that this device could be utilized with alternating current excitation of electromagnet 17 if coil cup 19 is made of a laminated material to reduce losses, and splined sleeve 8 and plug 13 are made of a magnetic permeable material to protect permanent magnet 9 from being demagnetized by the alternating current flux.

It will further be readily apparent that this invention provides an improved magnetic device such as a clutch or brake of the type utilizing a magnetic medium in the air gap which by virtue of its particular construction is adapted for use as a "fail-safe" brake. Likewise, by making member 3 rotatable, the device may be used as a clutch wherein power is transmitted even though the power supply is interrupted. It is further apparent that the subject device utilizes an unidirectional flux produced by an electromagnet to produce a repelling force tending to increase the air gap and also neutralizing the flux in the air gap whereby the magnetic medium is not capable of serving to transmit force.

While I have illustrated and described a particular embodiment of this invention, further modifications and improvements thereof will occur to those skilled in the art. I desire it to be understood, therefore, that this invention is not to be limited to the specific embodiment shown and I intend in the appended claims to cover all modifications thereof which do not depart from the spirit and scope of this invention.

What I claim as new and desire to secure by Letters Patent of the United States is:

1. In apparatus of the class described, a pair of axially spaced relatively rotatable members defining an air gap therebetween, and a magnetically susceptible mixture in said air gap, one of said relatively rotatable members having a permanent magnet arranged to create a first magnetic field in said air gap to cause said mixture to couple the relatively rotatable members, the other of said members having an electromagnet arranged to create a second magnetic field in said air gap in opposition to the first-mentioned magnetic field to prevent the first-mentioned magnetic field from causing the magnetic mixture to couple the relatively rotatable members, one of said members being axially movable responsive to the repelling action of said first and second magnetic fields thereby to increase said air gap whereby said first magnetic field is prevented from causing the coupling of said members when said electromagnet is energized.

2. In apparatus of the class described, a pair of axially spaced relatively rotatable members defining an air gap therebetween, a magnetically susceptible mixture in said air gap, one of said relatively rotatable members comprising an electromagnet arranged to create a first magnetic field in said air gap of one polarity, the other of said relatively rotatable members comprising a permanent magnet arranged to create a second magnetic field in said air gap of opposite polarity whereby a repelling force is created in said air gap, said other relatively rotatable member being axially movable responsive to said repelling force thereby to increase said air gap whereby said first magnetic field prevents the coupling of the relatively rotatable members when said electromagnet is energized, and means arranged to bias said other relatively rotatable member towards said one relatively rotatable member.

3. In apparatus of the class described, a pair of axially spaced relatively rotatable members, one of said members being mounted for axial movement on a shaft, said one member comprising an axially polarized permanent magnet having one axial face forming a first air gap with the axial face of said other member and a magnetic core having a portion abutting the other axial face of said permanent magnet and an axial face forming a second air gap with said axial face of said other member to provide a magnetic circuit for said permanent magnet, a magnetically susceptible mixture in said air gaps, said permanent magnet creating a magnetic field in said air gaps causing said mixture to normally couple said members, spring means for normally biasing said one member toward said other member, said other member having an electromagnet arranged when energized to create a field in said air gaps in opposition to said permanent magnet field whereby said mixture is prevented from coupling said members and said one member is repelled away from said other member against said spring increasing the width of said air gaps.

4. In apparatus of the class described, a pair of axially spaced relatively rotatable members, one of said members comprising a magnetic core and an axially polarized permanent magnet having an axial face forming a first air gap with the axial face of said other member, said core having a first portion abutting the other axial face of said permanent magnet and a second portion spaced from said permanent magnet with an axial face forming a second air gap with said axial face of said other member to provide a magnetic circuit for said permanent magnet, a magnetically susceptible mixture in said air gaps, said permanent magnet creating a magnetic field in said air gaps causing said mixture to normally couple said members, said other member having an annular groove formed in the axial face thereof intermediate said air gaps, said other member having an electromagnet arranged when energized to create a field in said air gaps in opposition to said permanent magnet field whereby said mixture is prevented from coupling said members.

KARL M. FEIERTAG.

References Cited in the file of this patent

UNITED STATES PATENTS

| Number | Name | Date |
|---|---|---|
| 811,654 | Murphy | Feb. 6, 1906 |
| 1,303,484 | Langdon-Davies | May 13, 1919 |
| 2,348,967 | Duby | May 16, 1944 |
| 2,519,449 | Findley | Aug. 22, 1950 |
| 2,544,360 | Schmidt | Mar. 6, 1951 |

FOREIGN PATENTS

| Number | Country | Date |
|---|---|---|
| 485,591 | Belgium | Nov. 13, 1948 |
| 129,318 | Sweden | Aug. 29, 1950 |